US009797339B2

(12) United States Patent
Evans

(10) Patent No.: US 9,797,339 B2
(45) Date of Patent: Oct. 24, 2017

(54) HOT-AIR ENGINE

(76) Inventor: Glyn Evans, Gordon (AU)

(*) Notice: Subject to any disclaimer, the term of this patent is extended or adjusted under 35 U.S.C. 154(b) by 0 days.

(21) Appl. No.: 14/114,852

(22) PCT Filed: Apr. 13, 2012

(86) PCT No.: PCT/AU2012/000383
§ 371 (c)(1),
(2), (4) Date: Jan. 29, 2014

(87) PCT Pub. No.: WO2012/151606
PCT Pub. Date: Nov. 15, 2012

(65) Prior Publication Data
US 2014/0352310 A1 Dec. 4, 2014

(30) Foreign Application Priority Data

May 6, 2011 (AU) ................. 2011901682

(51) Int. Cl.
F01K 25/02 (2006.01)
F02G 1/02 (2006.01)
F01C 1/08 (2006.01)
F01C 13/04 (2006.01)
F01C 1/02 (2006.01)
F01C 1/344 (2006.01)

(52) U.S. Cl.
CPC ............... *F02G 1/02* (2013.01); *F01C 1/08* (2013.01); *F01C 13/04* (2013.01); F01C 1/02 (2013.01); F01C 1/344 (2013.01); F02G 2254/15 (2013.01); F02G 2254/30 (2013.01); Y02E 10/46 (2013.01)

(58) Field of Classification Search
CPC .... F02C 1/05; F02C 6/14; F03G 6/064; F02G 2254/15; F02G 2254/30

USPC ....... 60/682, 641.14, 659; 126/641
See application file for complete search history.

(56) References Cited

U.S. PATENT DOCUMENTS 4,262,484 A * 4/1981 Jubb et al. ................. 60/641.14
6,615,586 B1 * 9/2003 Boric ........................... 60/729
2002/0017099 A1 * 2/2002 Thompson ............... F02G 1/02
60/597

FOREIGN PATENT DOCUMENTS

DE 3332726 A1 3/1985
DE 4317690 A1 * 11/1993 ............. F02G 1/043
(Continued)

OTHER PUBLICATIONS

PCT Search Report and International Preliminary Report on Patentability for PCT/AU2012/000383, completed Aug. 15, 2013.
(Continued)

*Primary Examiner* — Jason Shanske
*Assistant Examiner* — Kelsey Stanek
(74) *Attorney, Agent, or Firm* — Barnes & Thornburg LLP

(57) ABSTRACT

A hot-air engine (10) includes a compressor (12), a heating chamber (14), a rotary displacement type working engine (16) and a drive means (22). The compressor (12) has an inlet (12a) and an outlet (12b). The heating chamber (14) has an inlet (14a), in fluid communication with the outlet (12b) of the compressor (12), and an outlet (14b). The working engine (16) has an inlet (16a), in fluid communication with the outlet (14b) of the heating chamber (14), and an output shaft (16a). The drive means (22) connects the working engine (16) to the compressor (12) such that operation of the working engine (16) causes operation of the compressor (12).

22 Claims, 4 Drawing Sheets

(56) References Cited

FOREIGN PATENT DOCUMENTS

| JP | 56014889 A | 2/1981 |
|---|---|---|
| JP | 2002522693 A | 7/2002 |
| JP | 2006200434 A | 8/2006 |
| JP | 2008508463 A | 3/2008 |
| WO | WO79/01071 | 12/1979 |
| WO | WO 7901071 A1 * | 12/1979 |
| WO | WO2004063532 | 7/2004 |

OTHER PUBLICATIONS

European Search Report for Application No./Patent No. 12782973.7-1608/2691623, dated Apr. 7, 2015, 6 pages.
Solar Thermal Engine (Inventions), available at http://what-when-how.com/inventions/solar-thermal-engine-inventions/, accessed Jun. 22, 2016.
Solar Air Turbine Systems, available at http://arena.gov.au/project/solar-air-turbine-systems/, accessed Jun. 22, 2016.
Solugas, available at http://www.cspworld.org/cspworldmap/solugas, accessed Jun. 22, 2016.
Ericsson Cycle, available at https://en.wikipedia.org/wiki/Ericsson_cycle, accessed Jun. 22, 2016.
Roots-type Supercharger, available at https://en.wikipedia.org/wiki/Roots-type_supercharger, accessed Jun. 22, 2016.
Scuderi Engine, available at https://en.wikipedia.org/wiki/Scuderi_engine, accessed Jun. 22, 2016.

* cited by examiner

HOT-AIR ENGINE

CROSS-REFERENCE TO RELATED APPLICATIONS

This application is a national stage entry under 35 U.S.C. §371(b) of International Application No. PCT/AU2012/000383, filed Apr. 13, 2012, which claims the benefit of Australian Patent Application Serial No. 2011901682, filed May 6, 2011, the disclosures of which are hereby incorporated herein by reference.

FIELD OF THE INVENTION

The present invention relates to a hot-air engine for converting heat from external combustion, internal combustion, solar energy or other sources into mechanical work.

The invention has been primarily developed for use in conversion of low to medium grade heat from various sources into mechanical energy. One particularly useful application is the generation of electricity from solar energy. However, it will be appreciated that the invention is not limited to this particular application and is also suitable for transport and other automotive uses, including hybrid vehicles.

BACKGROUND OF THE INVENTION

Hot-air engines are known. One of the earliest examples of a hot-air engine was proposed by Sir George Cayley in 1807, which utilised a reciprocating piston compressor coupled to a reciprocating piston expansion engine. A more modern version of a known hot-air engine is a hot-air turbine engine.

Known hot-air engines suffer from numerous disadvantages, particularly when driven by relatively low temperature energy sources, including: poor mechanical efficiency; poor thermal efficiency; relatively large physical size relative to power output; and relatively high costs.

OBJECT OF THE INVENTION

It is the object of the present invention to substantially overcome or at least ameliorate one or more of the above disadvantages.

SUMMARY OF THE INVENTION

Accordingly, in a first aspect, the present invention provides a hot-air engine including:
a compressor with an inlet and an outlet;
a heating chamber with an inlet, in fluid communication with the outlet of the compressor, and an outlet;
a rotary displacement type working engine with an inlet, in fluid communication with the outlet of the heating chamber, and an output shaft; and
a drive means connecting the working engine to the compressor such that operation of the working engine causes operation of the compressor.

In one form, the rotary displacement type working engine is a Roots type blower working engine. It will be understood that the Roots type blower working engine is a Roots type blower pump or compressor being operated in the reverse direction to that used when operating as a pump or compressor.

In another form, the rotary displacement type working engine is a screw type working engine. It will be understood that the screw type working engine is a screw type compressor or pump being operated in reverse.

In yet another form, the rotary displacement type working engine is a modified Roots type blower (for example an Eaton type) or scroll type compressor. It will be understood that the modified Roots type blower working engine or scroll type compressor working engine is a Roots type blower screw type compressor or pump or scroll type compressor being operated in reverse.

In one form, the compressor is a rotary type compressor. In one variation of this form, the rotary type compressor is a two rotor compressor. The two rotor compressor is preferably a Roots type blower, a modified Roots type blower or a screw type. In another variation of this form, the rotary type compressor is a single rotor compressor. The single rotor compressor is preferably an axial turbine, a radial turbine, a vane compressor or a scroll type compressor.

In another form, the compressor is a reciprocating piston compressor.

The working engine preferably has capacity of about 20%-50% more than the capacity of the compressor.

In one form, the heating chamber is a furnace, preferably heated by internal or external combustion. In another form, the heating chamber is heated by one or more solar collectors, such as solar panels.

The working engine preferably includes an outlet. The outlet of the working engine is preferably in fluid communication with the inlet of the compressor.

The hot-air engine preferably includes at least one first duct between the outlet of the compressor and the inlet of the heating chamber. The hot-air engine preferably includes at least one second duct between the outlet of the heating chamber and the inlet of the working engine.

The hot-air engine preferably includes at least one third duct between the outlet of the working engine and the inlet of the compressor, thereby allowing the hot-air engine to operate in a closed cycle.

The hot-air engine preferably includes a residual heat removal exchanger in the third duct, upstream of the inlet of the compressor. Alternatively, the hot-air engine preferably includes at least one third duct between the outlet of the working engine and atmosphere. The hot-air engine preferably includes a heat exchanger between a portion of the at least one first duct and a portion of the at least one third duct.

BRIEF DESCRIPTION OF THE DRAWINGS

Preferred embodiments of the present invention will now be described, by way of examples only, with reference to the accompanying drawings in which.

DETAILED DESCRIPTION OF THE PREFERRED EMBODIMENTS

Figure 1:
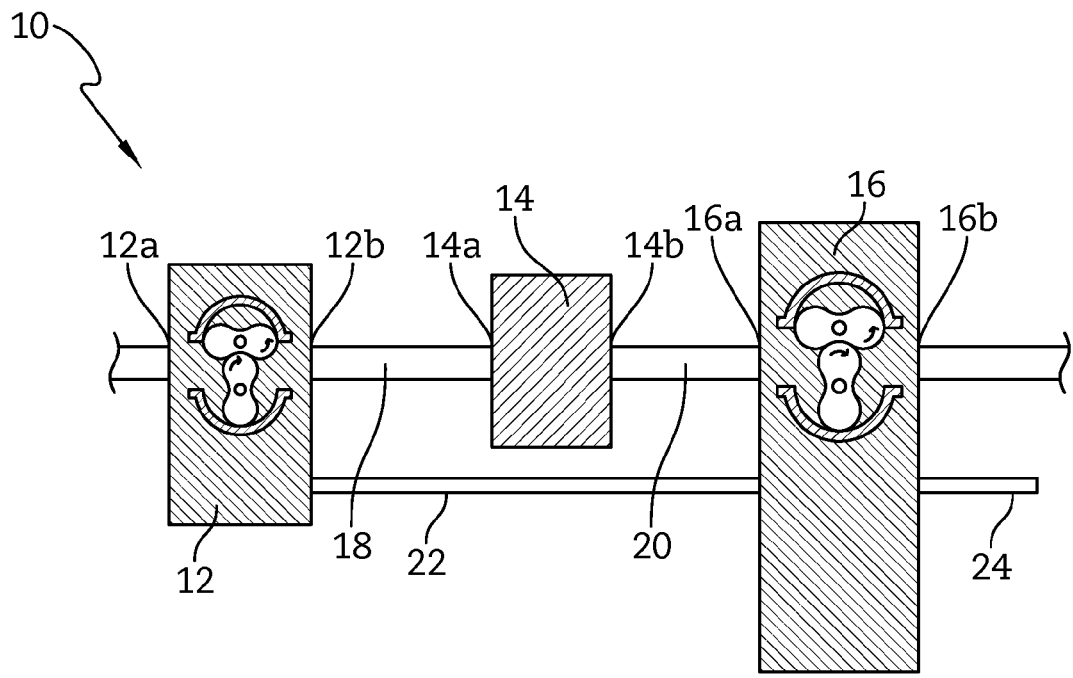
FIG. 1 is a schematic cross sectional side view of a first embodiment of hot-air engine.

FIG. 1 schematically shows a first embodiment of a hot-air engine 10 that includes a Roots type blower compressor 12, a heating chamber in the form of a furnace 14 and a Roots type blower displacement working engine 16. It will be understood by persons skilled in the art that the Roots type blower displacement working engine 16 is a Roots type blower pump or compressor being operated in the reverse direction to that used when operating as a pump or compressor.

The furnace 14 heats air using a process of external combustion. However, internal combustion is also able to used. The furnace 14 increases the pressure and volume of the air being supplied by the compressor 12, which then acts upon the working engine 16.

The capacity of the working engine 16 varies according to application. For a specific power output, the capacity of the working engine 16 is generally larger for lower temperature applications and smaller for higher temperature applications (such as automotive applications).

In addition, the ratio of the working engine capacity to the compressor capacity varies according to application, particularly operating temperature. As an example, to produce maximum power, the working engine 16 operating at about 300 Degrees Celsius would have a capacity which is about 30% more than the capacity of the compressor 12. As a further example, to produce maximum power, the working engine 16 operating at about 800 or 1000 Degrees Celsius would have a capacity which is about 50% more than the capacity of the compressor 12.

The compressor has an inlet 12a and an outlet 12b, the furnace has an inlet 14a and an outlet 14b and the working engine 16 has an inlet 16a and an outlet 16b. A first duct 18 connects the outlet 12b to the inlet 14a and a second duct 20 connects the outlet 14b to the inlet 16a.

The working engine 16 includes a drive shaft 22 which is mechanically coupled to the compressor 12, such that operation of the working engine 16 causes operation of the compressor 12. The working engine 16 also includes an output shaft 24 which, for example, can be connected to an electrical generator for electricity generation.

The operation of the hot-air engine 10 will now be described. Firstly, the furnace 14 is activated to heat air therein to about 300 Degrees Celsius and to cause the pressure in the furnace 14 to increase. The heated air and heated combustion products are communicated from the outlet 14b of the furnace 14 to the inlet 16a of the working engine 16, through the second duct 20, to act upon the working engine 16 and cause it to rotate. The rotation of the working engine 16 causes rotation in the compressor 12 which causes further air to be drawn into the inlet 12a, which is then compressed in the compressor 12 before being driven from the outlet 12b to the inlet 14a through the first duct 18.

An advantage of the hot-air engine 10 is it has improved thermal efficiency as the working engine 16 can operate at relatively high temperatures with little or no cooling. This is because the Roots type blower working engine 16 has relatively low friction, requires little or no lubrication (and hence has little or no heat loss from oil cooling requirements) and requires no cooling of its external surfaces. The use of Roots type blower compressors for the compressor 12 and also the working engine 16 also advantageously improves mechanical efficiency by minimising friction. The use of Roots type blower compressors for the compressor 12 (and other rotary type compressors) are also advantageous in that they can be easily scaled for larger engines and they produce very low levels of vibration.

Figure 2:
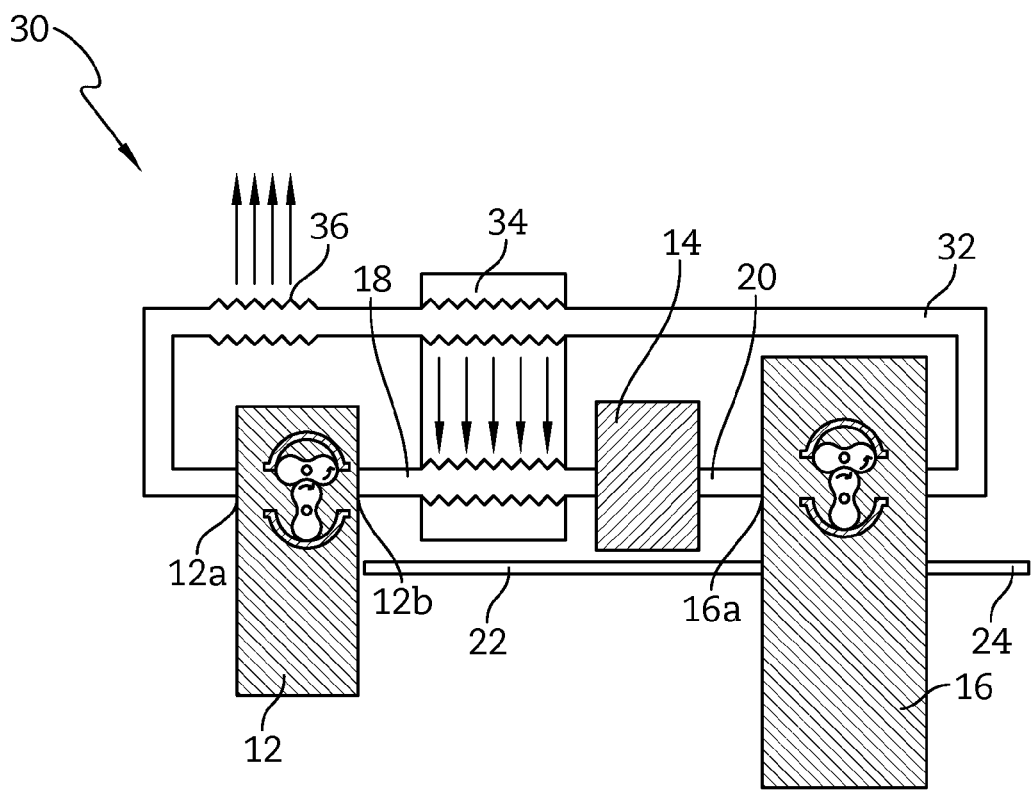
FIG. 2 is a schematic cross sectional side view of a second embodiment of hot-air engine.

FIG. 2 schematically shows a second embodiment of a hot-air engine 30. Like features to that described in relation to the hot-air engine 10 will be indicated with like reference numerals. The construction and operation of the hot-air engine 30 is similar to that of the hot-air engine 10 except that the heat engine 30 includes a third duct 32 connecting the outlet 16b of the working engine 16 to the inlet 12a of the compressor 12. The engine 30 also includes a heat exchanger 34, between a portion of the first duct 18 and a portion of the third duct 32. The engine 30 also includes a residual heat removal exchanger 36 in the third duct 32, upstream of the inlet 12a of the compressor 12.

The heat exchanger 34 improves thermal efficiency by increasing the temperature of the air supplied to the furnace 14. The use of the heat exchanger 34 permits the theoretical thermal efficiency of the hot-air engine 30 to rise from a maximum of about 28% to a maximum of about 72%, or greater if configured for higher efficiency at the expense of power.

The residual heat removal exchanger 36 removes heat that can not be used to heat the temperature of the air being supplied to the furnace 14 via the heat exchanger 34 so as to reduce the temperature of the air entering the inlet 12a of the compressor 12 to ambient or near ambient temperature.

The hot-air engine 30 operates in a closed cycle. As the operating gas can be pressurised, the power of the hot-air engine 30 is advantageously increased for a given engine size.

Figure 3:
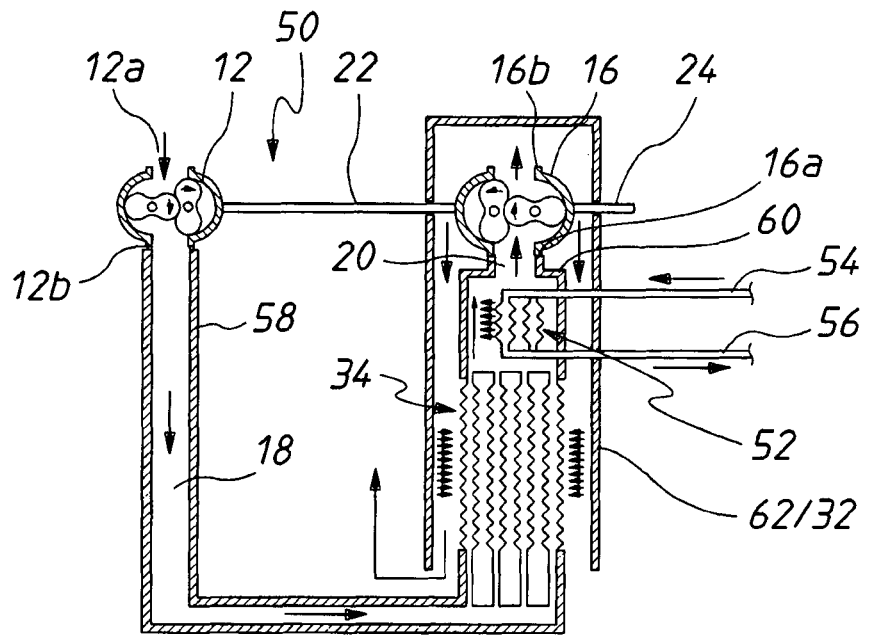
FIG. 3 is a schematic cross sectional side view of a third embodiment of hot-air engine.

FIG. 3 schematically shows a third embodiment of a hot-air engine 50. Like reference numerals to those used in describing features of earlier embodiments will again be used to indicate like features. In the hot-air engine 50, the furnace 14 is replaced by a heat exchanger 52 connected to a source of solar energy, such as one or more solar panels (not shown) via an inlet 54 and an outlet 56. If solar energy is not available, the heat exchanger 52 can be heated by stored solar thermal energy or other thermal energy sources.

In addition, the first duct 18, the second duct 20 and the third duct 32 are lagged with insulation 58, 60 and 62 respectively. This avoids heat losses and improves efficiency.

The hot-air engine 50 houses the heat exchanger 34, the heat exchanger 52 and the working engine 16 in one insulated housing so as to prevent heat loss. The hot-air engine 50 also advantageously arranges the heat exchangers 34 and 52 with a vertical temperature gradient. The hot-air engine 50 also includes an expansion area where the pressurised air from the working engine 16 can expand. This advantageously allows any kinetic energy from the air to be converted into increased thermal energy.

Figure 4:
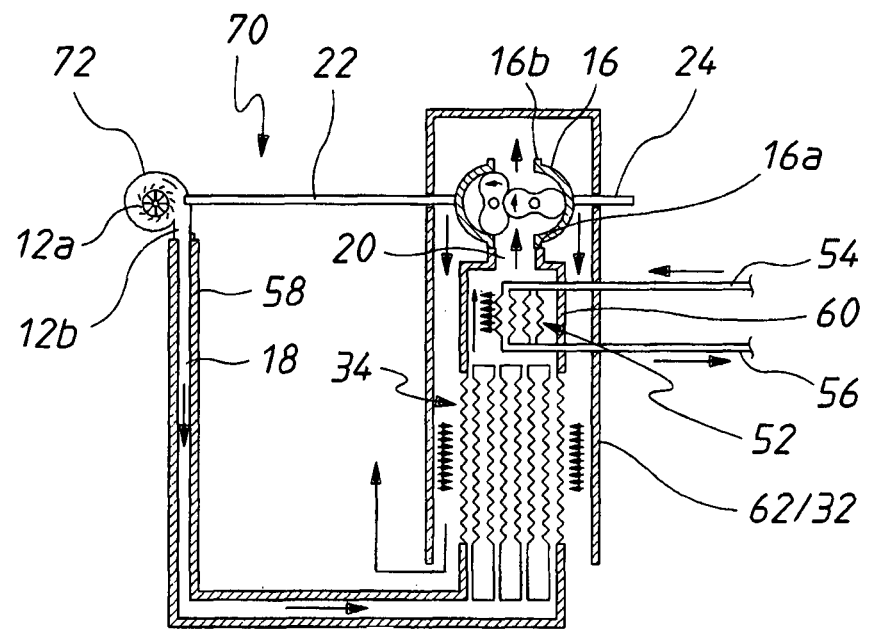
FIG. 4 is a schematic cross sectional side view of a fourth embodiment of hot-air engine.

FIG. 4 schematically shows a fourth embodiment of a hot-air engine 70 very similar to the hot-air engine 50 shown in FIG. 3. Like features are indicated with like reference numerals. However, in the heat engine 70, the compressor is in the form of a radial turbine compressor 72. An axial turbine compressor can also be used.

Figure 5:
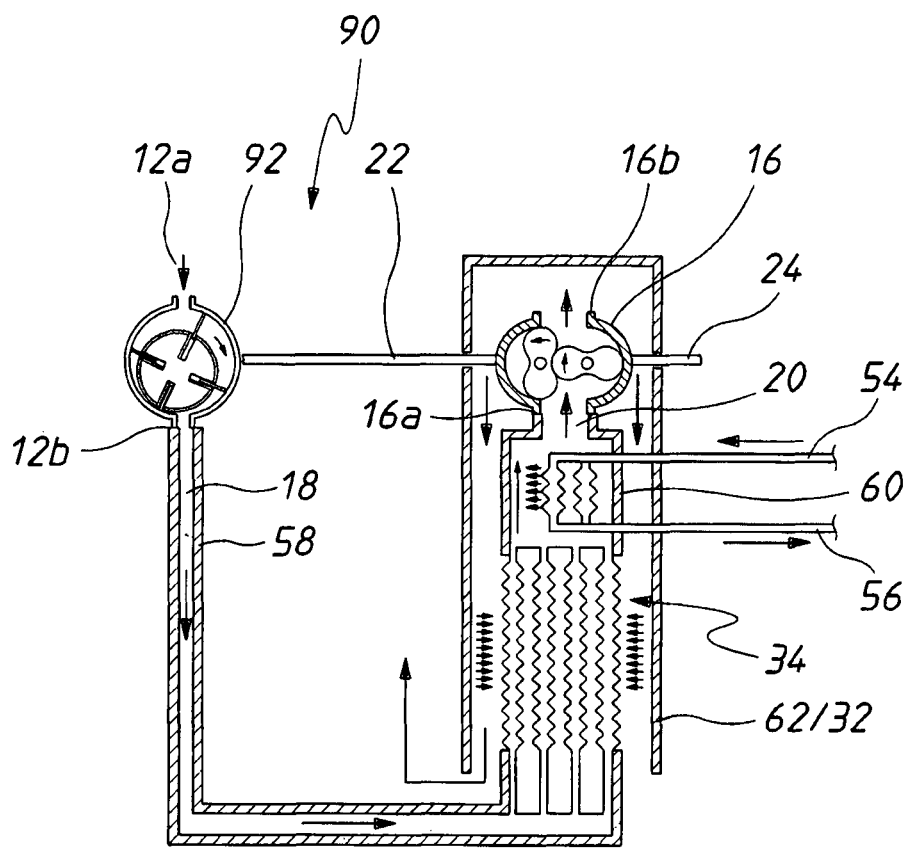
FIG. 5 is a schematic cross sectional side view of a fifth embodiment of hot-air engine.

FIG. 5 schematically shows a fifth embodiment of a hot-air engine 90 very similar to the hot-air engine 70 shown in FIG. 4. Like features are indicated with like reference numerals. However, in the hot-air engine 90, the compressor is in the form of a vane compressor 92.

Figure 6:
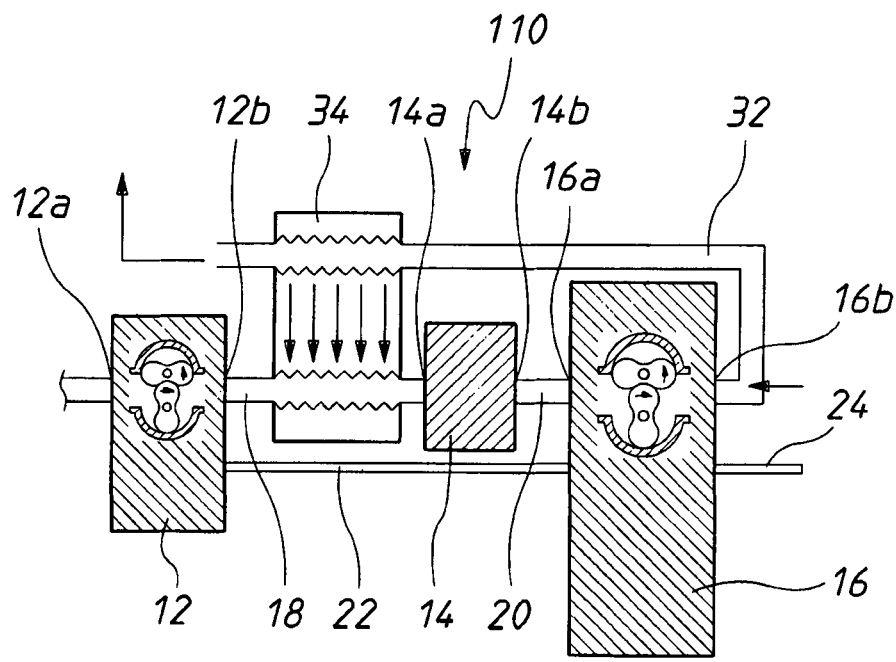
FIG. 6 is a schematic cross sectional side view of a sixth embodiment of hot-air engine.

FIG. 6 schematically shows a sixth embodiment of a hot-air engine 110 very similar to the hot-air engines 10 and 30 shown in FIGS. 1 and 2. Like features are indicated with like reference numerals. However, the hot-air engine 110 operates in an open cycle and does not use a residual heat removal exchanger 36.

Figure 7:
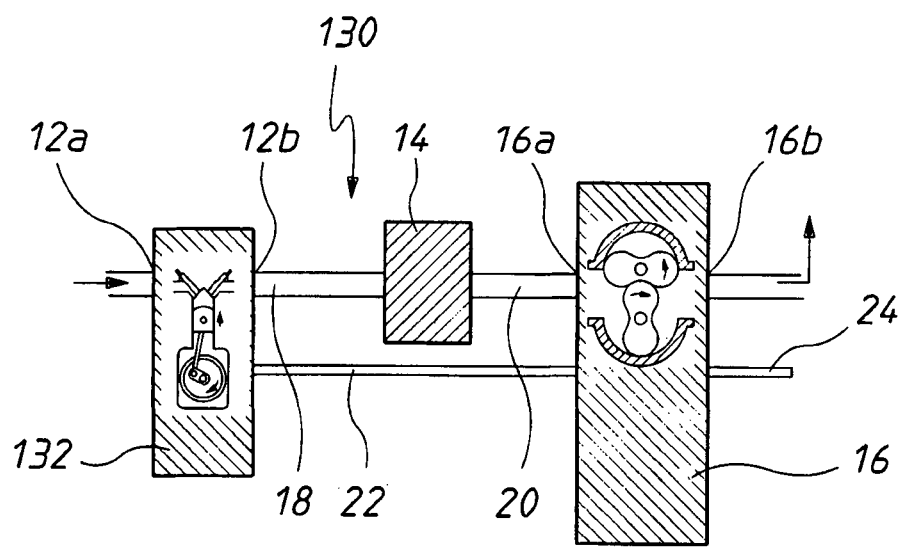
FIG. 7 is a schematic cross sectional side view of a seventh embodiment of hot-air engine.

FIG. 7 schematically shows a seventh embodiment of a hot-air engine 130 very similar to the hot-air engine 10 shown in FIG. 1. Like features are indicated with like reference numerals. However, the hot-air engine 130 uses a reciprocating piston compressor 132.

The embodiments of hot-air engines described above provide many advantages over both reciprocating piston hot-air engines and also hot-air turbine engines. When compared to a hot-air engine using a reciprocating piston compressor coupled to a reciprocating piston expansion engine, the embodiments described above provide improved efficiency, lower maintenance requirements, greater durability, and lower cost of production. When compared to a gas turbine engine, the embodiments described above are able to run on low to medium grade heat, are able to run on solid (renewable) fuels, have improved efficiency at maximum output and are able to retain or increase thermal efficiency when operating at less than maximum output.

Although the invention has been described with reference to preferred embodiments, it will be appreciated by persons skilled in the art that the invention can be embodied in many other forms.

For example, in applications using furnace temperatures in excess of 150 Degrees Celsius, the working engine can utilise a cooler for its bearings' lubricating oil, and/or can have external synchronising gears or external bearings (i.e. positioned outside of the hot area of the working engine) and/or can have insulation and/or thermal barriers between the rotors and the bearings to prevent heat soak from the rotors to the bearings. Insulation and/or thermal barriers can also be used between the bearings' housings and the main body of the working engine to prevent heat soak from the housings to the bearings. These features can also be used when furnace temperatures are below 150 Degrees Celsius.

A one way valve at the outlet of the compressor can also be used to stop reverse flow from the working engine going back into the compressor.

A gearbox, for example of the continuously variable type, can be fitted between the expansion engine and the compressor to control the compressor speed relative to the working engine speed.

Gases other than air and that have a lower gamma ratio than air (e.g. ammonia, carbon dioxide or butanol) can also be used within closed cycle embodiments to increase efficiency by up to about 15-20%.

The compressor can also be a Wankel type rotary compressor.

The invention claimed is:

1. A hot-air engine including:
   a compressor with an inlet and an outlet;
   a heating chamber with an inlet, in fluid communication with the outlet of the compressor, and an outlet; and
   a rotary displacement type working engine with an inlet in fluid communication with the outlet of the heating chamber, and an output shaft,
   wherein the working engine is connected to the compressor such that operation of the working engine causes operation of the compressor, and the working engine has a volumetric capacity of 20%-50% more than the volumetric capacity of the compressor.

2. The hot-air engine of claim 1, wherein the compressor is a rotary type compressor.

3. The hot-air engine of claim 2, wherein the rotary type compressor is a two rotor compressor.

4. The hot-air engine of claim 3, wherein the two rotor compressor is one of a Roots type blower, a modified Roots type blower, and a screw type.

5. The hot-air engine of claim 2, wherein the rotary type compressor is a single rotor compressor.

6. The hot-air engine of claim 5, wherein the single rotor compressor is one of an axial turbine, a radial turbine, a vane compressor, and a scroll type compressor.

7. The hot-air engine of claim 1, wherein the compressor is a reciprocating piston compressor.

8. The hot-air engine of claim 1, wherein the heating chamber is a furnace.

9. The hot-air engine of claim 8, further comprising one of an internal combustion source or an external combustion source, wherein the furnace is heated by heat supplied by the one of the internal combustion source or the external combustion source.

10. The hot-air engine of claim 1, further comprising at least one solar collector, wherein the heating chamber is heated by the at least one solar collector.

11. The hot-air engine of claim 1, wherein the working engine includes an outlet.

12. The hot-air engine of claim 11, wherein the outlet of the working engine is in fluid communication with the inlet of the compressor.

13. The hot-air engine of claim 12, wherein the hot-air engine includes at least one first duct between the outlet of the compressor and the inlet of the heating chamber.

14. The hot-air engine of claim 13, wherein the hot-air engine includes at least one second duct between the outlet of the heating chamber and the inlet of the working engine.

15. The hot-air engine of claim 14, wherein the hot-air engine includes at least one third duct between the outlet of the working engine and the inlet of the compressor such that the hot-air engine is operable in a closed cycle.

16. The hot-air engine of claim 15, wherein the hot-air engine includes a residual heat removal exchanger in the third duct, upstream of the inlet of the compressor.

17. The hot-air engine of claim 15, wherein the hot-air engine includes a heat exchanger between a portion of the at least one first duct and a portion of the at least one third duct.

18. The hot-air engine of claim 11, further comprising:
   at least one first duct between the outlet of the compressor and the inlet of the heating chamber;
   at least one second duct between the outlet of the heating chamber and the inlet of the working engine; and
   at least one third duct between the outlet of the working engine and atmosphere.

19. The hot-air engine of claim 1, wherein the rotary displacement type working engine is a Roots type blower working engine.

20. The hot-air engine of claim 1, wherein the rotary displacement type working engine is a screw type working engine.

21. The hot-air engine of claim 1, wherein the rotary displacement type working engine is a modified Roots type blower or scroll type compressor.

22. A hot-air engine including:
   a screw-type compressor with an inlet and an outlet;
   a heating chamber with an inlet, in fluid communication with the outlet of the screw-type compressor, and an outlet; and
   a rotary displacement type working engine with an inlet in fluid communication with the outlet of the heating chamber, and an output shaft,
   wherein the working engine is connected to the screw-type compressor such that operation of the working engine causes operation of the screw-type compressor, and the working engine has a volumetric capacity of 20%-50% more than the volumetric capacity of the screw-type compressor.

* * * * *